United States Patent [19]

Faber

[11] 4,206,277

[45] Jun. 3, 1980

[54] COMPOSITE ELECTRODE FOR STORAGE BATTERIES AND THE LIKE

[75] Inventor: Peter Faber, Karlstein am Main, Fed. Rep. of Germany

[73] Assignee: Rheinisch-Westfälishes Elektrizitätswerk AG, Essen, Fed. Rep. of Germany

[21] Appl. No.: 39,763

[22] Filed: May 17, 1979

Related U.S. Application Data

[63] Continuation-in-part of Ser. No. 885,184, Mar. 10, 1978, Pat. No. 4,161,569.

[30] Foreign Application Priority Data

May 31, 1978 [DE] Fed. Rep. of Germany ....... 2823771

[51] Int. Cl.² ............................................. H01M 4/72
[52] U.S. Cl. ..................................... 429/234; 429/241
[58] Field of Search .............................. 429/234–237, 429/241–244

[56] References Cited

U.S. PATENT DOCUMENTS

| 3,560,262 | 2/1971 | Baba et al. | 429/234 X |
| 3,973,991 | 8/1976 | Cestaro et al. | 429/237 X |
| 4,048,406 | 9/1977 | Sandera et al. | 429/237 X |
| 4,055,711 | 10/1977 | Ikari | 429/234 X |

Primary Examiner—Charles F. LeFevour
Attorney, Agent, or Firm—Karl F. Ross

[57] ABSTRACT

A metal/synthetic-resin composite electrode for a storage battery or the like comprises a perforate metal support which is flanked on both sides by openworks of polyolefin, e.g. partially fluorinated polyolefin, which are welded together within the openings of the support and carry the active material. The polyolefin openworks, together with the active material, are covered in turn with inorganic-fiber fabric or felt permeable fine porous cover layers. The inorganic fiber, although preferably glass, can also be mineral wool or asbestos fiber.

10 Claims, 5 Drawing Figures

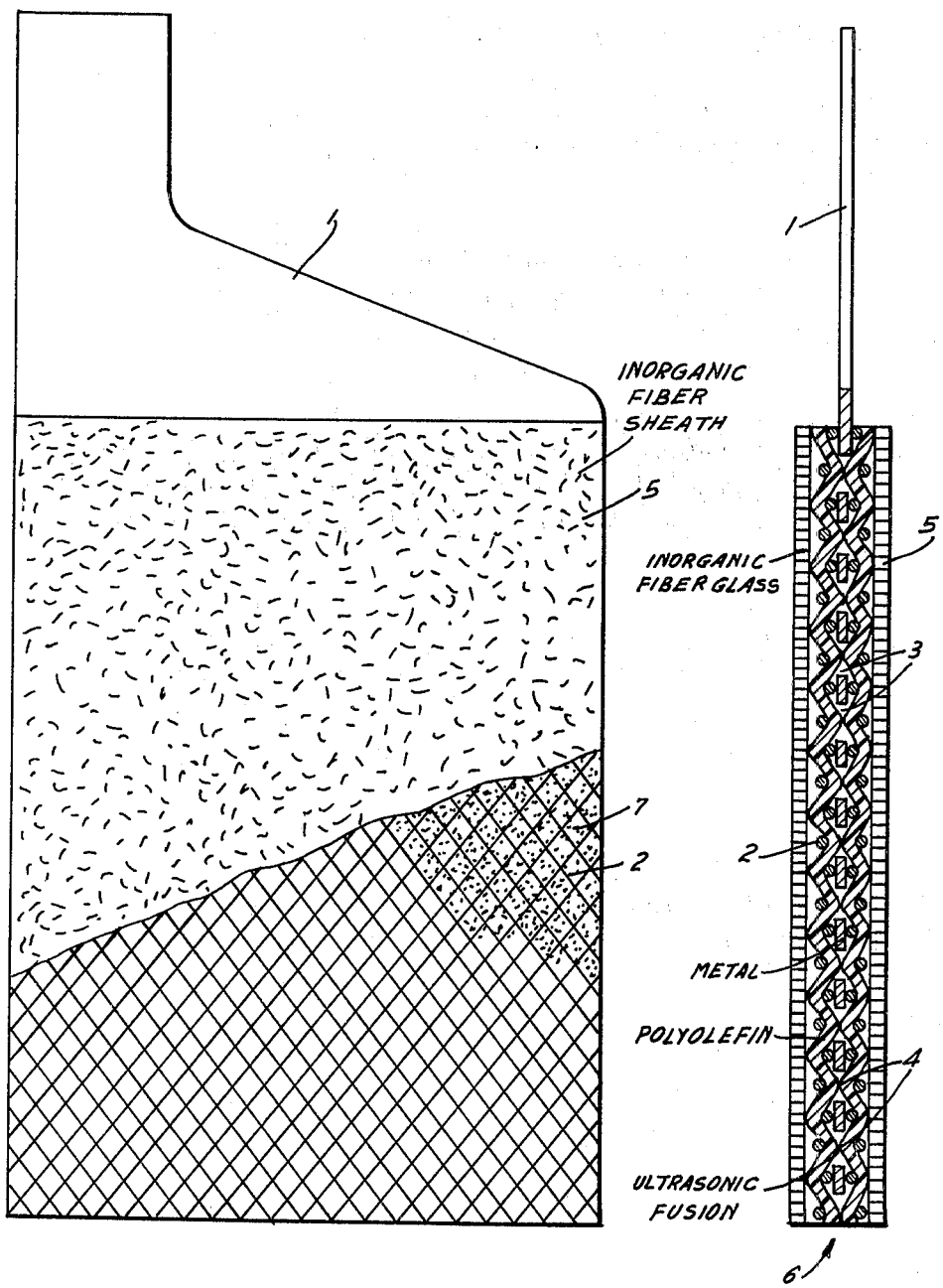

COMPOSITE ELECTRODE FOR STORAGE BATTERIES AND THE LIKE

CROSS REFERENCE TO RELATED APPLICATIONS

This application is a continuation-in-part of application Ser. No. 885,184 filed Mar. 10, 1978 now U.S. Pat. No. 4,161,569 and which, in turn, is related to the presently copending application Ser. No. 885,180 of Mar. 10, 1978. The present application is also related to the concurrently filed copending application Ser. No. 39,766. All of the above applications are in the name of the present inventor.

FIELD OF THE INVENTION

The present invention relates to a so-called composite electrode for storage batteries and other systems in which an electrochemically active mass must be provided upon a conductive support and, more particularly, to an improvement over the electrode described in application Ser. No. 885,184.

BACKGROUND OF THE INVENTION

It is known to provide electromechanical systems which are reversible, such systems including, for example, storage batteries having rechargeable electrodes. In, for example, lead-acid batteries and other accumulators, it is a common practice to apply the active mass (e.g. lead/lead oxide mass) to a metal carrier which serves as a mechanical support for the active mass and as a current collector or a current distributor upon discharge/charge cycling.

Because of the dependency of the life of the battery on retention of the mass on the support, considerable research has been carried out or techniques for improving the mechanical stability of the electrode upon charge/discharge cycling.

For example, the electrode may have one or more synthetic-resin layers which form pockets receiving the active mass. Pocketed metallic grids, wooden frame members and like systems have also been used to prevent migration of the active mass from and along the support.

The term "composite electrode" has been used by many to refer to metal/synthetic-resin electrode systems and reference may be had in this connection to the German published application (Auslegeschrift) No. 1,231,326 and U.S. Pat. No. 3,060,254 which deal with composite electrodes.

While such composite electrodes have been successful in large measure, because they do reduce the instability of the electrode structure, it cannot be entirely precluded that the active mass will, as a result of shape change during the charge/discharge cycling and especially as a result of swelling and contraction of the electrode, shed the active mass.

In prior-art systems, therefore, there is at least a partial loss of active material as a result of charge/discharge cycling.

The active material appears to deposit outside the synthetic-resin layer or to fall out of the pockets formed thereby. The synthetic-resin layers themselves are usually produced by the sintering of synthetic-resin powders or from synthetic-resin fibers.

To avoid these problems it has also been proposed to use tubular construction for the electrode, these electrodes being referred to generally as sheathed electrodes. In electrodes of the latter type, the swelling pressures, which are a consequence of volume changes in the active mass, are taken up by the tubes from which the electrodes are constituted. Within the tubes there are provided metallic wires serving as current collectors of conductors. The prime difficulty with such electrodes is that they are expensive to fabricate and frequently cannot be made in an entirely reproducible manner so that all of the electrodes give the same mechanical and electrical characteristics.

As noted previously, considerable effort has been expended in developing techniques in electrode fabrication and electrode structures so that a detailed review of the art, in this connection, would be impossible to present.

However, reference may be had, in this connection, to the following nonexclusive list of patents which may be considered pertinent art:

British Pat. No. 1,018,971
U.S. Pat. No. 482,043
U.S. Pat. No. 1,051,147
U.S. Pat. No. 1,158,491
U.S. Pat. No. 2,515,204
U.S. Pat. No. 2,858,352
U.S. Pat. No. 3,560,262
U.S. Pat. No. 3,772,089
U.S. Pat. No. 3,890,160
U.S. Pat. No. 3,973,991
U.S. Pat. No. 4,048,406
U.S. Pat. No. 4,055,711
U.S. Pat. No. 4,090,897

OBJECTS OF THE INVENTION

It is the principal object of the present invention to provide an improved composite electrode which overcomes disadvantages of earlier systems and which extends the principles set forth in my copending application Ser. No. 885,184 mentioned previously.

It is another object of this invention to provide a metal/synthetic-resin composite electrode which does not deteriorate as a result of volume changes in the active mass during charge/discharge cycling and which can be fabricated in a particularly simple and highly reproducible manner.

SUMMARY OF THE INVENTION

As noted, this invention is an extension of the principles set forth in Ser. No. 885,184.

In that application, I have disclosed a metal/synthetic-resin composite electrode for storage batteries, accumulators and the like in which a metal current collector and support is provided in the form of a perforated generally flat body with throughgoing openings through which access can be afforded from one side of the electrode to the other. This support is covered on both sides or flanks with the synthetic-resin openwork layers which receive the active mass. To prevent shape change or, at least, limit it to the extent that it is not detrimental or a significant problem, these synthetic-resin openworks are formed as nets, screens, fabrics or grids of synthetic-resin filaments or strands and are fused together through openings in the support, advantageously so that the fusion point lies wholly within the body of the support.

In a preferred embodiment, the synthetic-resin openworks which receive the active mass are overlain by synthetic-resin cover layers of fine-porous construction which are fused to the synthetic-resin openworks. These fine-porous synthetic-resin layers can form a sheath in which the active mass is enclosed.

In carrying out the fabrication of a composite electrode according to the invention, mechanical pressure and ultrasonic energy is applied to locally fuse the two synthetic-resin openworks together within the opening of the support while pressure and heat is applied to bond the fine-porous cover layers to the synthetic-resin openworks.

The resulting structures have been found to have especially long lives, to be highly reproducible and, in general, to be a significant advance over the art of composite electrodes.

I have now discovered that even this improvement can be markedly advanced, quite surprisingly, by the use of selected synthetic-resin materials for the openwork and inorganic-fiber fine-porous cover layers.

While one would normally expect that any synthetic-resin materials resistant to the electrolyte may be used for the openwork and fine-porous cover layers, this has not proved to be the case and, in particular, I have found that critical to the life (number of charge/discharge cycles) of the electrode is the choice of the synthetic-resin material from which the openwork layer is composed and the material from which the porous sheath layer is constituted.

More particularly, I have found that a marked increase in the useful life of the composite electrode can be achieved when the openwork is constituted of fibers, filaments or strands of polyolefin, especially a partially fluorinated polyolefin and if simultaneously the cover layers are constituted by an inorganic-fiber fabric or felt, preferably a glass-fiber or felt.

The "felt" of the present invention is a nonwoven mat-like or fleece-like structure which can be needled to increase the coherency.

In a preferred embodiment of the invention, the synthetic-resin openwork designed to be fused through the openings of the support and to carry the active mass, is composed of a low-homologous polyolefin or a partially fluorinated polyolefin which is preferably a polymerized difluorinated ethylene having the formula

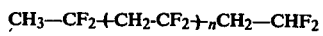

where n is an integer.

In practice such polymers can be represented by the formula

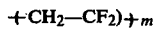

where m is equal to n+2. The polyolefin can be of the low-density type with a molecular weight of 7000 to 12000.

Surprisingly, the latter material has characteristics similar to polytetrafluoroethylene but is far more effective upon ultrasonic welding in the manner described as is important to the instant invention, than polytetrafluoroethylene.

According to the principles set forth in my earlier application Ser. No. 885,184, the cover layers on both sides of the metal support are thermally welded together continuously along their edges around all of the edges of the metal support structure except that portion of the support structure which can form a terminal tab or tongue. This affords a full or complete sheathing of the active mass.

It will be apparent from the foregoing that the polyolefin openwork layers applied to the support are fused together at points within the openings of the support, constitute a pocketed structure adapted to permit volume change of the active mass while serving as a completely stable structure in the static sense. Mechanical stresses are taken up by the polyolefin layers applied directly to the metal support and then result in a loosening of the mass from the latter. The polyolefin openwork layers themselves are connected through the support and hence cannot be dislodged, torn or otherwise released therefrom. In addition, the sheathing layers of glass fabrics or glass felt are bonded to the underlying polyolefin layers over their entire surfaces and remain structurally connected to the basic electrode components even under the most extreme of operating conditions.

According to the invention, moreover, the conductive metal support is constituted as a grid, advantageously a cast grid, although preferably it is provided with openings by the slitting/expansion technique known in the art. In other words, the metal support may be a so-called expanded-metal structure.

It is also significant that the metal support is covered on both sides with the polyolefin synthetic-resin layers which are formed from synthetic-resin strands fused together through the openings of the metal support. The integration of the polyolefin layers with one another and with the metal structure through the openings of the latter by a point-like fusion of the strands or filaments of the polyolefin layers provides a multipoint connection.

The fabrication technique is relatively simple and requires only a successive or single-step welding of the polyolefin layers together by the application of ultrasonic welding fields and the simultaneous application of pressure. A continuous welding operation can be carried out by passing the electrode structure between a pair of ultrasonically energized rollers. Preferably, however, the electrode structure is pressed between a pair of ultrasonically energized platens.

The active mass can be applied to the pockets thereby formed in the polyolefin layers, preferably after a fine-porous sheathing or cover layer is applied to one side of the electrode structure. After the active mass is applied, the other side of the electrode can be covered with a sheathing layer of the fine-porous glass material and the entire assembly subjected to a hot pressing operation to bond the newly applied sheathing layer to the previously applied screen, net, fabric or web of polyolefin material and to effect the bonding around at least three sides of the rectangular electrode structure.

The active mass can be applied by dry pressing, moist pasting or any other conventional technique.

More specifically, the low-homologous polyolefins of the present invention are low-pressure polyethylene

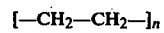

which, for the present purpose, should have a chain length n of $6 \times 10^3$ to $4 \times 10^6$, or high-pressure polyethylene with a chain length n of $5 \times 10^3$ to $5 \times 10^4$, or polypropylene

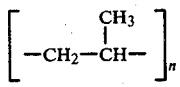

of corresponding chain lengths n, or polybutylenes of similar chain lengths.

BRIEF DESCRIPTION OF THE DRAWING

The above and other objects, features and advantages of the present invention will become more readily apparent from the following description, reference being made to the accompanying drawing in which:

FIG. 1 is a vertical cross-sectional view through an electrode according to the invention, the portions thereof being shown in greatly enlarged scale and in diagrammatic form;

FIG. 2 is an elevational view of the electrode, partly broken away;

SPECIFIC DESCRIPTION

Figure 3:
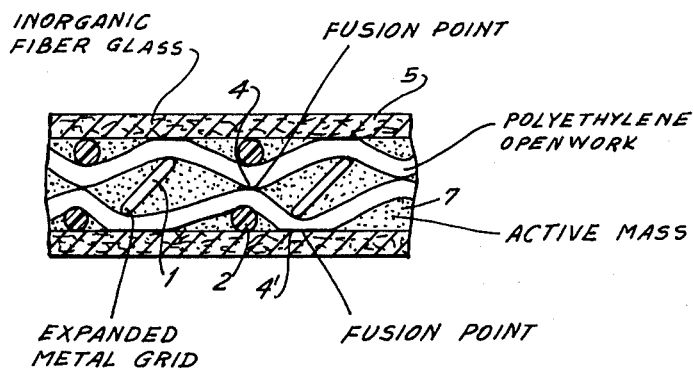
FIG. 3 is a cross-sectional view illustrating features of the invention, shown also in diagrammatic form.

The composite electrodes shown in FIGS. 1 through 4 may be used for storage batteries or electrical accumulators in accordance with the examples given below. Basically, each electrode comprises a metal support or carrier 1, shown as a flat plate, provided with openings 3 in a surface distribution, these openings being throughgoing so that they are accessible from either side of the support.

On both sides of the support, there are provided respective polyolefin or partially fluorinated polyolefin layers 2 formed from filaments or strands and hence having an open configuration. These polyolefin layers 2 can be termed polyolefin openworks. The polyolefin layers 2 form pockets to receive the active mass which has been shown at 7 in the drawing. The active mass can be pasted in the pockets in a moist state and can then be permitted to dry or can be applied under pressure as a powder.

The synthetic-resin layers 2 are welded together at point welds 4 by ultrasonic energy and the application of pressure. The welds 4 are thus formed in the openings 3 of the metal support.

After the application of the active mass, the latter can be sheathed with fine-porous cover layers 5 of glass-fiber material. The cover layers 5 can be nonwoven fiber fleeces or mats (felts), the mats 5 being fused at point 4' to the underlying layer 2.

As can be seen from FIG. 3, the metal support may be an expanded metal grid in which the openings are formed by slitting the metal plate and then stretching the same to rotate portions of the plate between the slits at an angle to the plane of the plate.

The fusion points between the mats 5 and the screens 2 of polyolefin filaments have been shown at 4' in greater detail in FIG. 3.

Figure 4:
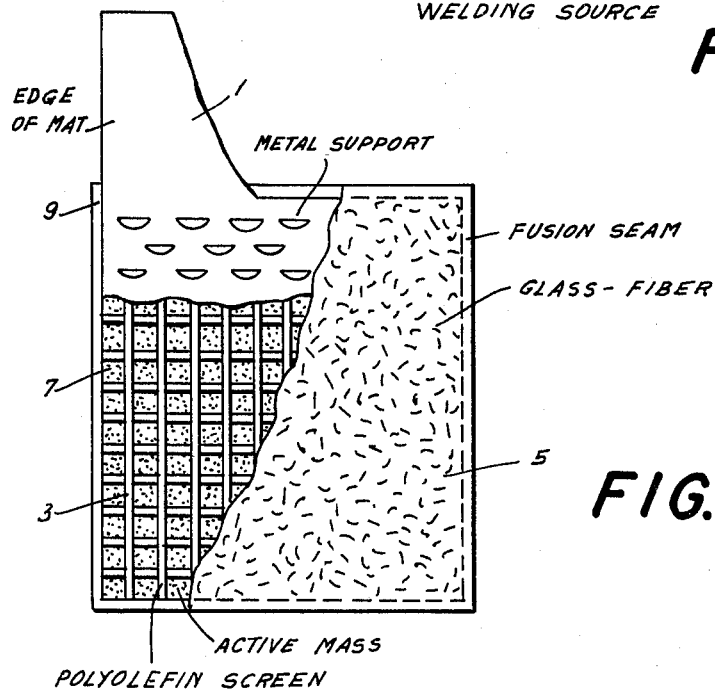
FIG. 4 is a view similar to FIG. 2 but illustrating another feature of the invention.

FIG. 4 shows that the edges of the mats 5 can extend beyond the outlines of the electrode so that they can be welded together and to any projecting portion of the grids or openworks 2 along these edges. The projecting edges are represented at 9 in FIG. 4 and the fusion seams at 8 around the edges of the metal support. The result is a continuous weld seam around the active mass fully encapsulating the latter and represented at 6 in FIG. 1.

Figure 5:
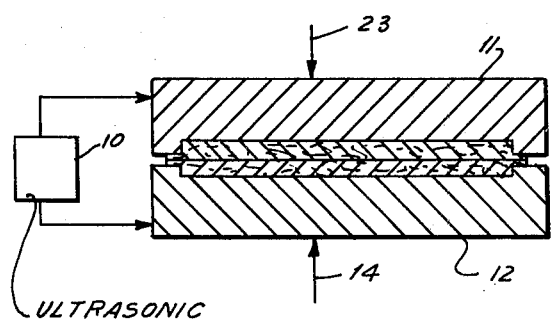
FIG. 5 is a cross-sectional view through an apparatus for carrying out a process for making the electrode of FIGS. 1 through 4.

In FIG. 5 I have shown the fusion of the assembly of FIG. 4 together between a pair of platens 11 and 12 of an ultrasonic welding tool, pressure being applied in the direction of arrows 13 and 14 and the ultrasonic energy being delivered by the ultrasonic welding source 10. The polyolefin is preferably polyethylene or difluoroethylene. The term "glass" is here used specifically although the less preferred "mineral wool" or "asbestos" can be used in each case.

SPECIFIC EXAMPLES

An expanded-metal plate of lead/calcium/tin alloy having dimensions, in the region to be covered by the active mass, of 70 by 120 mm and provided with openings which can each have an area of about 4 mm square, is used as the metal support. The metal plate has a thickness of about 2.3 mm and is covered on opposite sides with synthetic-resin screens of polydifluoroethylene having a thickness of 0.5 mm and a spacing of the strand of the screen of about 2 to 3 mm.

All three layers are ultrasonically welded together as illustrated in FIG. 5 with the application of a pressure of 10 to 30 c/cm$^2$ using a flat ultrasonic welding tool. Investigation shows that the two synthetic-resin grids are fused together at points with the openings of the metal support.

In a second, thermal welding operation, a nonwoven fiber mat of glass fibers is fused to one side of the electrode assembly, i.e. to one of the synthetic-resin grids. To this assembly is applied, by doctoring, a moist paste of a positive active mass constituted of a lead/lead dioxide mixture. Such mixtures are commonly used in the storage-battery industry for lead-acid batteries. After drying, the open side of the assembly is sheathed by a second fine-porous glass-fiber nonwoven mat welded to the synthetic-resin screen on the formerly open side of the structure. The active mass is thus distributed in the many small pockets of the synthetic-resin screens. The positive electrode is immersed in sulfuric acid and charged in the usual way.

EXAMPLE II

Using a conventional lead/antimony alloy grid for starting batteries having a thickness of 1.3 mm, the process described above is carried out with synthetic-resin webs on either side of the grid. The synthetic-resin layers or sheets have a thickness of 0.5 mm perforated with large openings having dimensions of about 3×3 mm.

EXAMPLE IIa

Using the grid of Example II and the perforated sheets described therein, the sheets are applied to the metal grid and the active mass is pasted in the openings of these sheets. After drying of the active mass, the lead/synthetic-resin structure is subjected to high energy ultrasonic fusion to bond the synthetic-resin sheets to one another through the openings in the grid. In a subsequent step, the two glass fiber cover layers 5 are applied and welded to the synthetic-resin sheets and to one another along the edges of the electrode. Otherwise the electrode is formed up as described in Examples I and II.

EXAMPLE IIb

The procedure of Example II is followed except that the glass fiber cover layers 5 are applied without previous welding of the synthetic-resin perforated sheets together and the entire assembly is fused ultrasonically together in a single step. In Examples IIa and IIb, the electrodes are formed up in sulfuric acid as described in Example I.

The electrodes can be made by the method described in the above-identified copending application Ser. No. 885,180 which is hereby included by reference in toto.

I claim:

1. A composite electrode for storage batteries and the like, comprising:
    a metal support provided with a multiplicity of throughgoing openings;
    respective polyolefin synthetic-resin layers constituted as openwork sheets of screened fabric, net or grid structure flanking said support on opposite sides thereof, said layers being directly fused together the openings in said support and at points within said openings;
    an electrochemically active mass received in the openworks of said layers; and
    respective fine-porous cover layers in the form of inorganic fiber fabric or felt overlying and bonded to the respective polyolefin layers.

2. The composite electrode defined in claim 1 wherein the polyolefin layers are formed of low-homologous polyolefin or partially fluorinated polyethylene.

3. The composite electrode defined in claim 2 wherein the polyolefin layers are formed of polyethylene, polypropylene or polybutylene.

4. The composite electrode defined in claim 2 wherein the polyolefin layers are formed of polydifluoroethylene.

5. The composite electrode defined in claim 2 wherein said fine-porous cover layers are composed of glass, mineral wool or asbestos fibers.

6. The composite electrode defined in claim 2 wherein the polyolefin layers are welded together around edges of said support.

7. The composite electrode defined in claim 2 wherein the polyolefin layers are screens of polyolefin strands.

8. The composite electrode defined in claim 2 wherein the polyolefin layers are fabrics.

9. The composite electrode defined in claim 2 wherein the polyolefin layers are nets.

10. The composite electrode defined in claim 2 wherein the cover layers are nonwoven mats of glass fiber.

* * * * *